US008941821B2

(12) United States Patent
Coupe et al.

(10) Patent No.: US 8,941,821 B2
(45) Date of Patent: Jan. 27, 2015

(54) SYSTEM AND METHOD FOR UNIFORM AND LOCALIZED WALL THICKNESS MEASUREMENT USING FIBER OPTIC SENSORS

(75) Inventors: Peter Coupe, West Sussex (GB); Damon Richard Roberts, Hampshire (GB); Dmitry Belov, St.Petersburg (RU); Evgeniya Myalo Deger, Moscow Region (RU); Masafumi Fukuhara, Moscow (RU); Yamid Pico, Moscow (RU); Rogerio Tadeu Ramos, Eastleigh (GB); Ian Peirce, Hampshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 638 days.

(21) Appl. No.: 13/256,633

(22) PCT Filed: Mar. 18, 2010

(86) PCT No.: PCT/GB2010/000505
§ 371 (c)(1),
(2), (4) Date: Jan. 11, 2012

(87) PCT Pub. No.: WO2010/106336
PCT Pub. Date: Sep. 23, 2010

(65) Prior Publication Data
US 2012/0099097 A1    Apr. 26, 2012

Related U.S. Application Data

(60) Provisional application No. 61/161,088, filed on Mar. 18, 2009.

(51) Int. Cl.
*G01B 11/16* (2006.01)
*G01B 11/06* (2006.01)
(Continued)

(52) U.S. Cl.
CPC .............. *G01B 11/06* (2013.01); *G01B 11/18* (2013.01); *G01B 21/045* (2013.01); *G01D 3/0365* (2013.01); *G01D 5/35383* (2013.01); *G01L 9/0032* (2013.01)
USPC .......................................................... 356/32

(58) Field of Classification Search
CPC ........ G01B 11/18; G01B 11/06; G01K 11/32; G01K 11/3206
USPC ................................... 356/32–35.5, 445–448
See application file for complete search history.

(56) References Cited

U.S. PATENT DOCUMENTS 5,218,197 A * 6/1993 Carroll ...................... 250/227.19
5,230,488 A * 7/1993 Condon ........................ 248/73
(Continued)

FOREIGN PATENT DOCUMENTS

| WO | 03/078932   | 9/2003 |
| WO | 2006/050488 | 5/2006 |
| WO | 2008/001046 | 1/2008 |

OTHER PUBLICATIONS
Fiber Optics Systems Technology, Inc. "Direct Assessment of Corrosion Using Fiber Optic Sensors," NACE, 2007, Paper No. 07385.
(Continued)

*Primary Examiner* — Kara E Geisel
*Assistant Examiner* — Maurice Smith
(74) *Attorney, Agent, or Firm* — Chamberlain Hrdlicka (57) ABSTRACT

A system and method are provided for determining wall thickness of a structure such as a metallic pressurized pipe. The system includes an optical fiber having a plurality of Fiber Bragg Gratings (FBGs), and a mounting for securing the FBGs over discrete portions of the exterior surface of the pipe such that strain in the pressurized pipe wall is transmitted to the FBGs. The system further includes a light source and a light sensor coupled to an end of the optical fiber. The light sensor converts light reflected back from the FBGs into electrical signals that a digital processor converts into strain measurements. The FBGs are mounted around portions of the pipe expected to have significant metal loss as well as portions of the pipe expected to have negligible metal loss. The method includes at least one of comparing relative strains at locations with negligible metal loss to those with significant metal loss to accurately determine the thickness of the wall with metal loss; compensating for temperature effects by considering relative strains at areas of the pipe with and without metal loss; and measuring axial strain on the pipe with one or more of the FBGs to correct for at least one of bending and torsion effects on hoop strain.

15 Claims, 6 Drawing Sheets

(51) Int. Cl.
*G01B 21/04* (2006.01)
*G01D 3/036* (2006.01)
*G01D 5/353* (2006.01)
*G01L 9/00* (2006.01)

(56) References Cited

U.S. PATENT DOCUMENTS

| | | | |
|---|---|---|---|
| 6,813,403 B2 * | 11/2004 | Tennyson | 385/12 |
| 7,154,081 B1 * | 12/2006 | Friedersdorf et al. | 250/227.14 |
| 7,157,691 B2 * | 1/2007 | Lim et al. | 250/227.14 |
| 7,660,496 B2 | 2/2010 | Robers | |
| 2002/0194932 A1 | 12/2002 | Gysling et al. | |
| 2003/0038231 A1 | 2/2003 | Bryant et al. | |
| 2004/0173010 A1 | 9/2004 | Gysling et al. | |
| 2006/0045408 A1 * | 3/2006 | Jones et al. | 385/12 |
| 2008/0047662 A1 | 2/2008 | Dria et al. | |

OTHER PUBLICATIONS

Tennyson R.C., et al: "Intelligent Pipelines Using Fiber Optic Sensors," Proceedings of the International Society for Optical Engineerings, SPIE, USA, vol. 5050, Jan. 1, 2003, pp. 295-304.

R.C. Tennyson, W.D. Morison:"Long gage-length fiber optic sensors for monitoring pipeline integrity", SPIE, PO Box 10 Bellingham WA 98227-0010 USA,, Feb. 27-Mar. 1, 2006, XP040222352.

* cited by examiner

SYSTEM AND METHOD FOR UNIFORM AND LOCALIZED WALL THICKNESS MEASUREMENT USING FIBER OPTIC SENSORS

BACKGROUND

1. Technical Field

The present invention generally relates to methods and systems for strain measurement, and more particularly to a system and method for uniform and localized wall thickness measurement using fiber optic strain sensors.

2. Discussion of Background Art

Fiber optics have been employed to monitor corrosion in several different forms. A number of applications employ fiber optics to monitor the strain generated within reinforced concrete due to build up of corrosion products. Others relate to the impact of corrosion on metal coated fibers or fibers doped with compounds that fluoresce in the presence of a target chemical species. However, these techniques require exposure of the fiber to the corrosive fluids.

An externally mounted fiber optics system by Fiber Optics Systems Technology, Inc. is described in "Direct Assessment of Corrosion Using Fiber Optic Sensors," NACE, 2007, Paper no. 07385, wherein the system employs Brillouin spectrum analysis. Similarly, WIPO Patent Application No. WO2003078932A1 is directed to a system for the monitoring of large structures using Brillouin spectrum analysis. However, such systems do not employ Fiber Bragg Grating (FBG) sensors for uniform and localized wall thickness measurement.

Finally, a fiber optic system employing external FBG sensors to measure the strain applied to structural joints is described in U.S. Pat. No. 7,660,496, assigned to Schlumberger Technology Corporation. Again, such systems do not employ Fiber Bragg Grating (FBG) sensors for uniform and localized wall thickness measurement.

SUMMARY OF THE DISCLOSURE

The above and other problems are addressed by the exemplary embodiments, which provide a system and method that employ Fiber Bragg Grating (FBG) fiber optic sensors to reliably and non-intrusively determine wall thickness measurements, and characterize localized metal loss features over a range of geometries and applications. The exemplary system and method can be used to complement existing fiber optic monitoring capabilities, including pressure, temperature, buckling, vibration, and the like, and provide for a versatile surveillance system and method that can be permanently installed or deployed by a remotely operated vehicle (ROV) to determine uniform or localized corrosion features, and the like.

More specifically, the system includes an optical fiber having a plurality of Fiber Bragg Grating sensors (FBGs), and a mounting for securing the FBGs over discrete portions of the exterior surface of the pipe such that strain in the pressurized pipe wall is transmitted to the FBGs. A light source and a light sensor are coupled to the optical fiber. The light sensor converts light reflected back from the FBGs into electrical signals that a digital processor converts into strain measurements. The strain measurements are in turn converted to wall thickness measurements by way of an empirical formula based on data points or by a mathematical model.

The mounting used to secure the FBGs in place may be a composite material in either mat or sheet form that the optical fiber and the FBGs are embedded in that is adhered or otherwise secured over the outer surface of the pipe. In one embodiment, the composite material is in the form of a rigid mat shaped to conform to the curved outer surface of the pipe that covers the outer surface of the pipe. The FBGs are preferably arrayed within the sheet of composite material such that when the mat is applied and secured to the pipe, the FBGs are aligned with selected portions of the length and circumference of the pipe in such a way as to determine differential axial and hoop strains at selected locations in the pipe. Alternatively, the composite material may be in the form of a flexible sheet that is wrapped around the pipe and secured by adhesives or straps or other mounting means. In both of these embodiments, the composite sheet material not only properly aligns the FBGs, but also protects them and their respective optical fibers from mechanical shock and corrosive fluids. The mounting may additionally take the form of a composite clamp assembly attachable around the circumference of the pipe. Such a composite clamp assembly may include a plurality of contact focus strips that determine differential hoop strain across selected portions of the pipe. Such a clamp-type mounting may advantageously be retrofitted onto pipes already in service, such as undersea pipes used to convey petroleum products.

The FBGs are preferably mounted around portions of the pipe expected to have significant metal loss as well as portions of the pipe expected to have negligible metal loss. The method includes at least one of comparing relative strains at locations with negligible metal loss to those with significant metal loss to accurately determine the thickness of the wall with metal loss; compensating for temperature effects by considering relative strains at areas of the pipe with and without metal loss; and measuring axial strain on the pipe with one or more of the FBGs to correct for at least one of bending and torsion effects on hoop strain.

The use of FBG sensors has numerous advantages over wall thickness detectors employed in the prior art. The FBGs are relatively small (i.e. on the order of 1 cm long) and are capable, when employed in the system of the invention, of providing a high resolution picture of the strain experienced by a pressurized pipe wall at a number of small and discrete points. Moreover, the optical fibers that the FBGs are incorporated in are capable of providing a clean, high signal to noise ratio over long distances that is not compromised by electromagnetic interference generated by, for example, the ferric alloys used in many pressurized pipes. Finally, the exterior location of the FBGs, plus the fact that they are embedded in a composite material, advantageously protects them from corrosive fluids and mechanical shock.

Still other aspects, features, and advantages of the present invention are readily apparent from the entire description thereof, including the figures, which illustrate a number of exemplary embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

The present invention generally relates to a method and system for determining wall thickness measurements of pressurized pipes, elbows, vessels, and the like, employing fiber optics sensors, and a validation testing procedure, and working examples therefor. For example, for a pipe or vessel, the resultant strain on the structure due to internal pressure is a function of the wall thickness. Other factors including bending or twisting forces, thermal expansion, and the like, can also impact on the strain. Accordingly, in an exemplary embodiment, Fiber Bragg Gratings (FBGs) are employed to provide discrete high resolution strain measurements over the surface of pressurized pipes and vessels. The FBGs can be employed along with various correction algorithms, compensation techniques, and the like, for example, to determine wall thickness readings, and the like. In addition, the exemplary embodiments, advantageously, provide the capability to map out discrete measurements of strain, for example, to determine wall thickness distribution and corrosion profile mapping across vessels surfaces, straight pipe sections, elbows, complex geometries, and the like.

Figure 1:
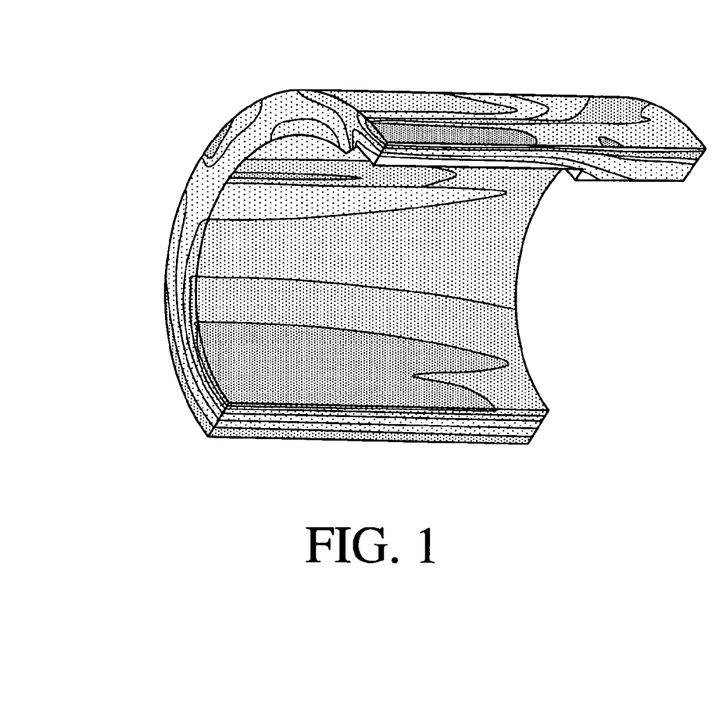
FIG. 1 illustrates exemplary strain distribution about a metal loss feature.

Referring now to the drawings, wherein like reference numerals designate identical or corresponding parts throughout the several views, and more particularly to FIG. 1 thereof, there is illustrated exemplary strain distribution about a metal loss feature. In FIG. 1 the strain distribution is shown around a typical top of line corrosion feature.

Figure 2A:
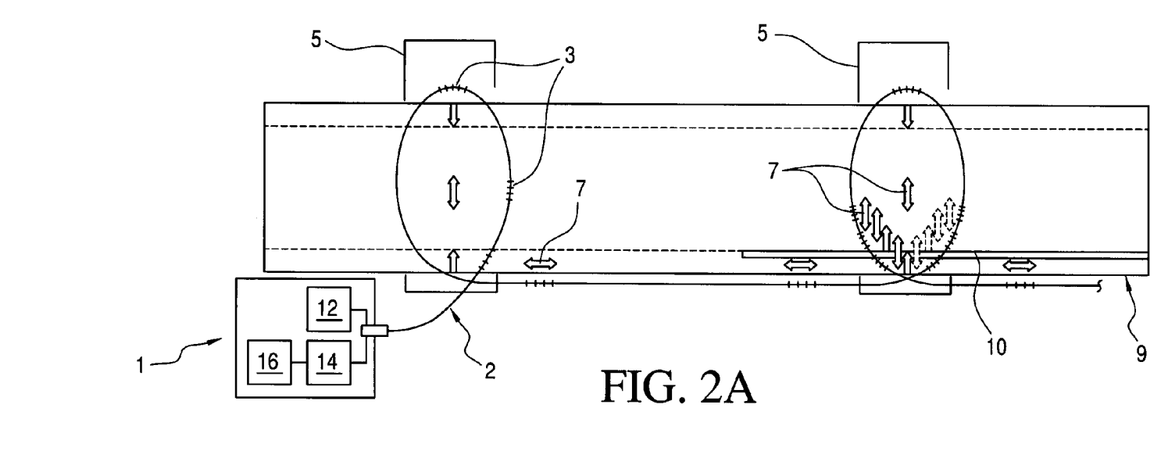
FIGS. 2A and 2B illustrate the system of the invention, and how it takes Fiber Bragg Grating (FBG) strain measurements at discrete, selected portions of a pipe.
Figure 2B:
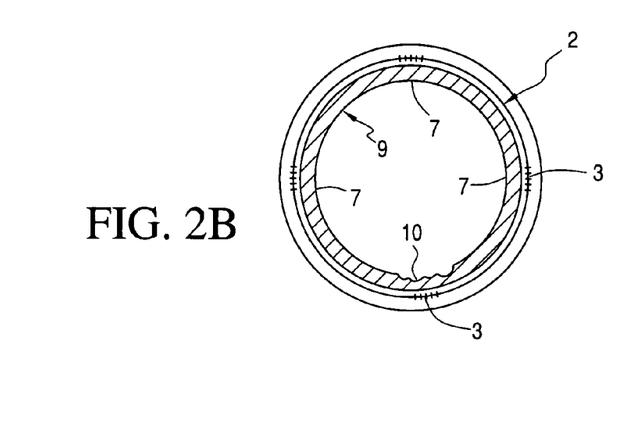

FIGS. 2A and 2B generally illustrate the system 1 of the invention. The system 1 includes an optical fiber 2 having a plurality of FBGs 3 incorporated therein. Mountings 5 are used to secure the FBGs 3 of the optical fiber 2 over selected, discrete portions 7 of a pressurized pipe 9 such that strain applied to the discrete portions 7 is transmitted to the FBGs. While the pipe 9 will be metallic in most applications, it need not be so for the system to operate. As the minimum spacing between the FBGs 3 in the optical fiber 2 must be on the order of 1 meter or more to avoid interference between the optical signals generated thereby, it will be necessary to form loops (not shown) in the segments of optical fiber 2 between the FBGs 3 for most pipes since the discrete portions 7 are often only on the order of 10 cm apart. As indicated in FIGS. 2A and 2B, some of the FBGs 3 are preferably located along the longitudinal axis of the pipe 9, while others are located around the circumference of the pipe 9 at the bottom, top and sides. The FBGs 3 are preferably concentrated near the bottom of the pipe 9 in most applications as this is the location where wall thinning 10 is most likely to occur due to corrosion and erosion caused by the movement of abrasive particulates along the bottom of the pipe 9. Such an arrangement of FBGs 3 allows both the width and depth of a localized corrosion feature to be mapped.

One end of the optical fiber 2 is connected to both a source of light 12, and a light sensor 14 via a standard optical coupling of a type known in the art. The frequency of the light reflected by the FBGs is dependent upon the amount of strain applied to the FBGs. The light sensor 14 converts the various frequencies of the reflected light from the FBGs into electrical signals. These signals are processed by other circuit components (not shown) and are relayed to a digital processor 16 which converts the processed signals into strain measurements for each of the FBGs 3. As described in more detail hereinafter, these strain measurements are converted into a wall thinning depth via an empirical formula derived from measurement data or by mathematical modeling.

Figure 3:
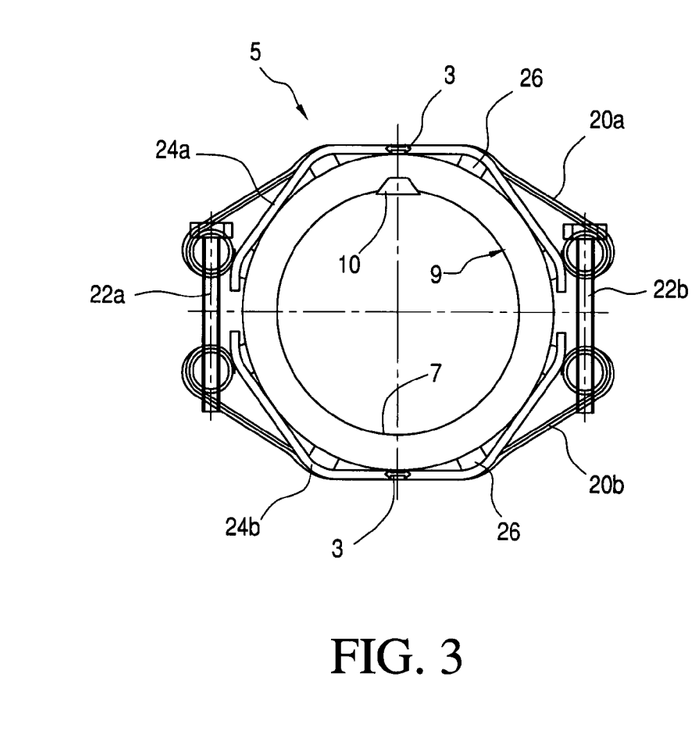
FIG. 3 illustrates a clamp mounting for the FBGs of the system that may be used to determine differential hoop strain around a selected portion of the pipe.
Figure 4:
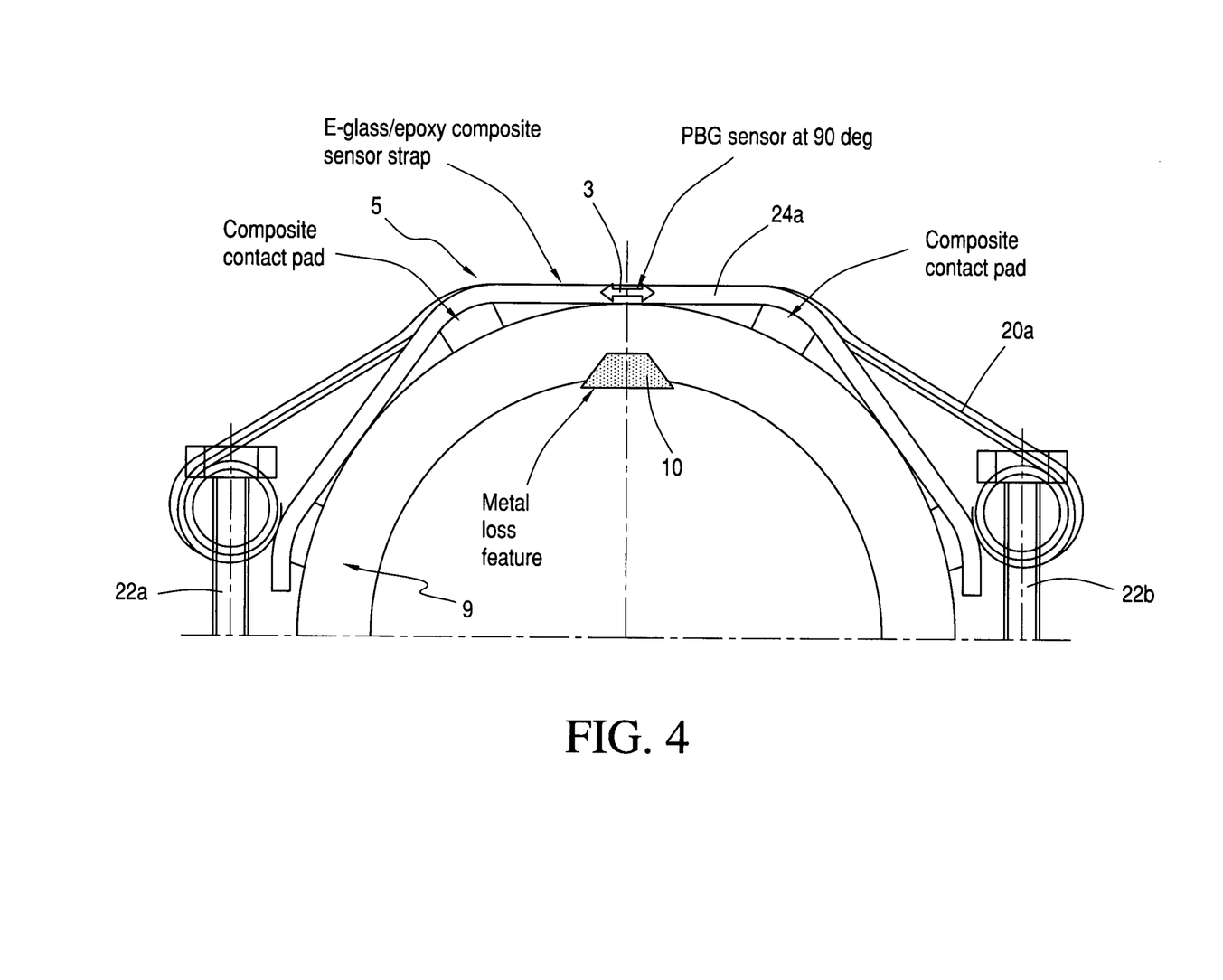
FIG. 4 illustrates an exemplary clamp geometry and contact pads to focus strain measurement in defined areas.

FIGS. 3 and 4 illustrate an exemplary mounting 5 useful for determining differential hoop strain. Mounting 5 includes two clamp sections 20a, 20b that are drawn together by clamping bolts 22a, 22b. Disposed beneath the clamp sections 20a, 20b are composite sensor straps 24a, 24b which circumscribe the upper and lower halves of the pipe 9. The straps 24a, 24b are preferably formed from an e-glass/epoxy composite. An FBG 3 is integrated in the middle portion each of the straps 24a, 24b as shown. The sections of the straps 24a, 24b containing the FBGs are stretched between contact pads 26 and are secured in such a position via pressure applied by the clamping sections 20a, 20b such that any increase in tangential strain experienced by the pipe 9 in the 12 and 6 o'clock positions as a result of wall thinning will be mechanically transmitted to the FBGs 3. It is important to note that this particular mounting 5 may advantageously be retrofitted onto pipes already in operation, such as deep water or undersea pipes used to convey petroleum products. As will be described hereinafter, the mounting 5 of the FBGs 3 can take other forms, including the FBGs 3 being bonded directly to a base material that is in turn bonded to the pipe 9, or the FBGs 3 being mounted within a composite-based mat or sheet like structure, or the like.

The novel system and method can include sensor design, correction algorithms, compensation techniques, and the like. The exemplary sensor design can include (1) application of FBGs 3 to determine wall thickness by monitoring external strain on the pipe, vessel or other pressurized structure wall; (2) FBGs applied or embedded within a composite base material to determine wall thickness; (3) FBG composite clamp assembly geometries with contact focus strips to determine differential hoop strain across defined regions; and the like.

The exemplary correction algorithms and compensation techniques, can include (1) comparing the relative strains at locations with negligible metal loss to those with metal loss to determine the wall thickness, advantageously, without the need for internal pressure readings; (2) compensating for temperature effects by considering the relative strains at areas with and without metal loss; (3) for pipeline or flowline, measuring axial strain by the FBGs 3 to correct for any bending or torsion or other effects on hoop strain; and the like.

Advantageously, the exemplary method and system can be used with horizontal pipes and structures. For example, for a pipeline or flowline, corrosion tends not to be uniform around a circumference. For multiphase systems, the majority of the corrosion is in the bottom of the line due to water drop out and deposits. For gas systems, corrosion tends to be localized at top of the line due to water condensation and limited corrosion inhibitor availability at this point. Hence, the relative hoop strain between the 3 or 9 o'clock position (e.g., for no corrosion) and the areas of interest can be employed to provide temperature compensated readings for wall thickness without needing a value for pressure in the line. In addition, further correction is provided by monitoring the axial stress, bending and torsion to correct for the impact on hoop stress.

Figure 5:
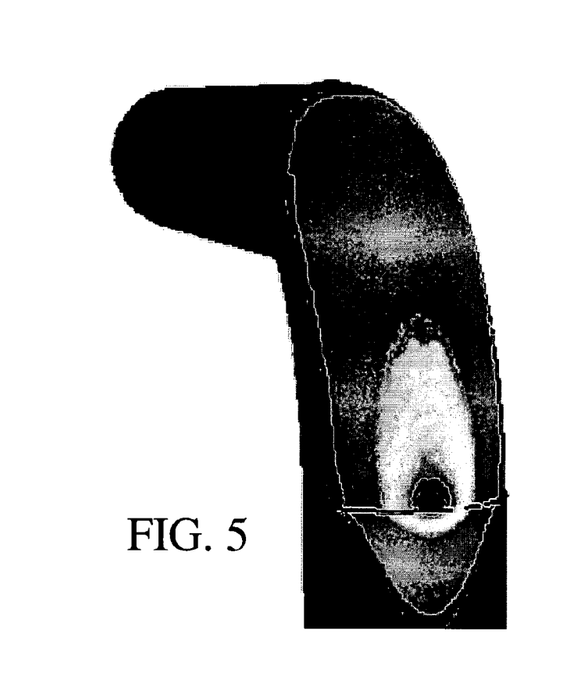
FIG. 5 illustrates an exemplary computational fluid dynamics (CFD) diagram of sand erosion in a pipe elbow.

Advantageously, the exemplary method and system can be used outside of a bend. For example, the locations for maximum sand erosion or erosion corrosion can be determined by modeling. FIG. 5 shows a typical computational fluid dynamic diagram (CFD) of sand erosion on the outside of a bend.

Figure 6:
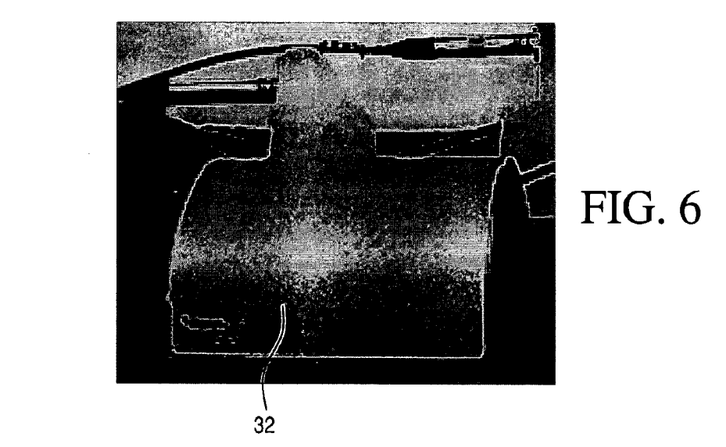
FIG. 6 illustrates exemplary multi dropped mat assemblies including FBG sensors.
Figure 7:
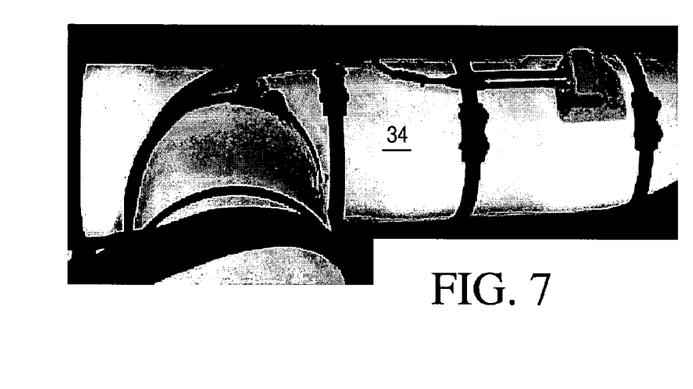
FIG. 7 illustrates an exemplary field application under insulation.

As illustrated in FIGS. 6 and 7, the FBGs 3 can be preinstalled within a composite mat structure that can be bonded directly to the pipe 9 or other structure. In FIG. 6 there are illustrated exemplary composite mat assemblies 32 including FBGs. The mat assemblies 32 are free standing and shaped to match the contour of the pipe 9 that they are to be bonded to. Two or more mat assemblies 32 may be connected by a hinge and may be fastened around the pipe 9 in a claim shell arrangement. The composite material used to make such a mat assembly 32 may be, for example, glass fibers or carbon fibers in a epoxy resin or a polyester resin. While not specifically shown in FIG. 6, the mat assemblies have a plurality of FBGs 3 arranged both along the axis of the pipe 9 and around the circumference of the pipe 9 in much the same way as schematically illustrated in FIGS. 2A and 2B, with a concentration of FBGs in the area of interest. FIG. 7 illustrates flexible sheet like composite material 34 in which a pattern of FBGs have been integrated which have in turn been wrapped and bonded to the exterior of a pipe 9. The pattern of FBGs in the composite sheet has been selected so that the FBGs are positioned in discrete locations of interest on the pipe 9 when wrapped thereon. Again, the structure of such a flexible composite sheet material 34 may be, for example, glass fibers or carbon fibers in a epoxy resin or a polyester resin as described in U.S. Pat. No. 7,660,496, the entire text of which is specifically incorporated herein by reference. While not shown in the Figures, the mat assemblies 32 and composite sheets 34 may be adhered to the outer surface of the pipe 9 by epoxies or other adhesives or bonded mechanically by straps (as shown) or bolts or magnetic fasteners. Both mat assembly 32 and the flexible composite sheet material 34 preferably have a lower mechanical strength than the pipe 9 they are bonded to so that strain applied to the pipe is mechanically transmitted to the mat assembly 32 and the flexible composite sheet material 34. Both the mat assemblies 32 and composite sheets 34 are illustrated with an optical coupling that attaches the optical fiber 2 to the light source 12, light sensor 14 and digital processor 16 described in FIG. 2A.

The array of FBGs 3 can be optimized with a more highly populated sensor array around the area of interest, and a less populated array in areas where there is negligible metal loss to assess the overall structural strain. Analysis of such readings provide for a compensated metal loss profile for the elbow. The exemplary system and method also can be used with various other pipe or vessel geometries, wherein expected corrosion/erosion profiles thereof can be used to dictate the position, number, orientation, and the like, of the FBGs. In addition, modeling can be employed to determine the impact of metal loss features on strain distribution, which can also be employed to configure the sensor array and assist in the analysis of the responses.

Exemplary validation testing is employed to demonstrate the ability of the system and method to determine uniform and localized wall thickness measurement. The test system includes a pipe section with flange end piece and access fittings to be pressurized. Axial features are machined at a 6 o'clock position for a section of pipe to 85% and 70% wall thickness. FBG sensor arrays are mounted at 12, 3, 6, and 9 o'clock positions to measure hoop stress. Additional sensors are placed axially. A high density population of hoop strain FBGs placed around the 6 o'clock position is used to characterise localized features at the machined feature location. Differential hoop strain clamp assemblies are installed to monitor strain distribution. The test system is filled with water and the performance of the FBG sensor arrays is assessed over a range of pressures and temperatures. The real-time corrosion measurement performance is also determined by employing an electrode placed near and parallel to the 6 o'clock position at the uniform profiled section, allowing electro etching (e.g., anodic dissolution) of the pipe wall at this position. The sensor array is monitored throughout this process. The strain results are analysed and wall thickness and feature dimensions determined. The testing demonstrates the ability of the system to determine wall thickness and monitor in real time localized corrosion within a pipe.

The following is a working example for uniform corrosion in a typical deepwater flowline, for an X65 carbon steel 12" pipeline, with a wall thickness of 28 mm, designed with a corrosion allowance of 8 mm, deployed at 2000 m and subject to internal pressure up to 300 bar, as shown in the following table.

TABLE 1

Hoop strain and change in circumference over pressure range for pipeline with and without corrosion allowance.

| Inputs | | |
|---|---|---|
| Sea depth | m | 2000 |
| Pipe External Diameter | mm | 323.9 |
| Pipe thickness | mm | 28 |
| Young Modulus | Pa | 2.10E+11 |
| Corrosion allowance | mm | 8 |
| Poisson ratio | | 0.3 |
| Calcs | | |
| External Pressure | bar | 196.2 |
| Internal Diameter | mm | 267.9 |
| Internal Diameter (No Corrosion Allowance) | mm | 283.9 |

Figure 8:
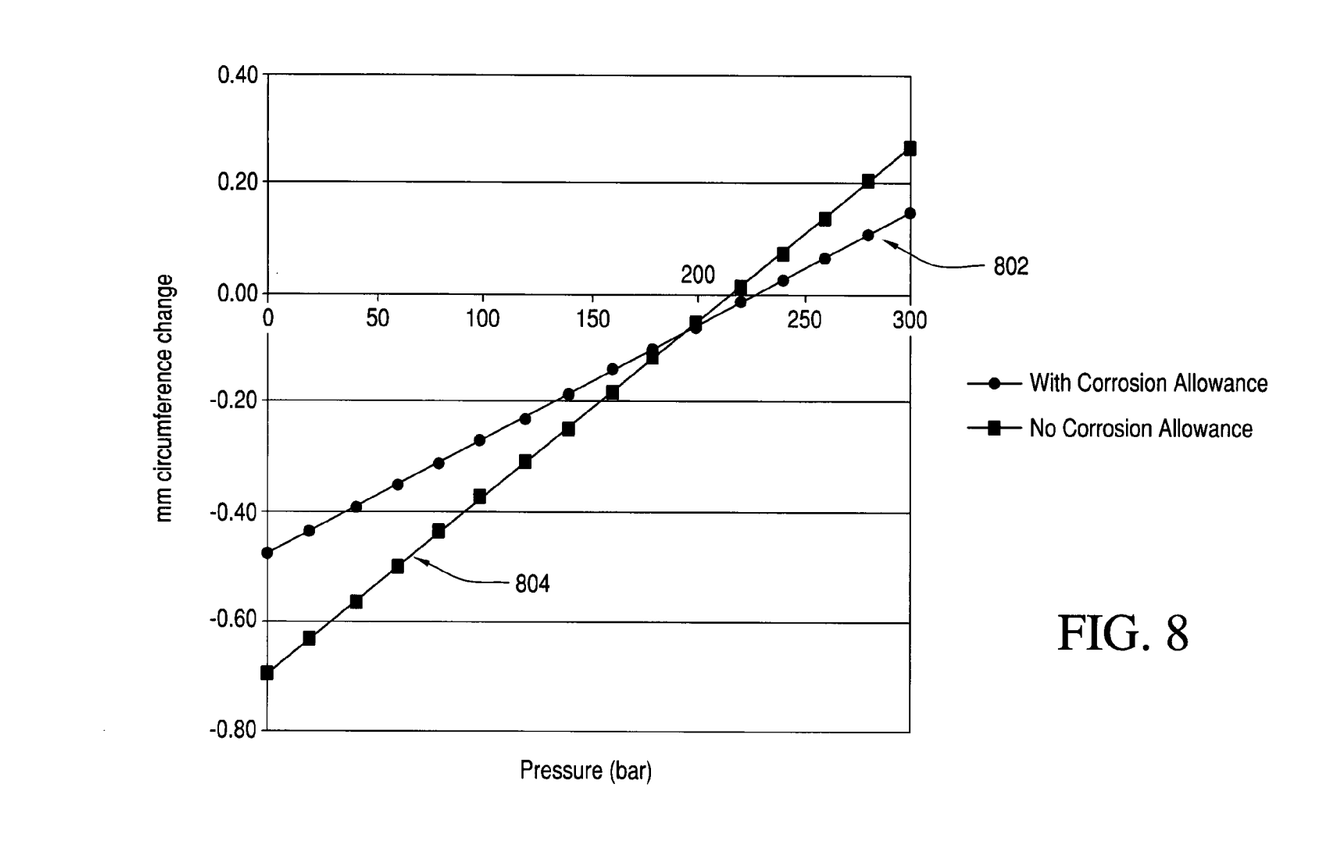
FIG. 8 illustrates an exemplary graph of circumference change versus pressure for a pipeline with and without corrosion allowance.

Taking these inputs, and assuming two scenarios; one with full wall thickness and the other zero remaining corrosion allowance, the difference the resultant strain over a range of pressures can be determined, as shown in with respect the following table and FIG. 8, which illustrates an exemplary graph of circumference change versus pressure for a pipeline with corrosion allowance (data points 802) and without corrosion allowance (data points 804).

TABLE 2

Hoop strain and change in circumference over pressure range for pipeline with and without corrosion allowance.

| Internal Pressure Bar | With Corrosion Allowance | | No Corrosion Allowance | | Delta | |
|---|---|---|---|---|---|---|
| | Outer Hoop Strain | Change in Circumference mm | Outer Hoop Strain | Change in Circumference mm | Outer Hoop Strain | Change in Circumference mm |
| 0   | −4.70E−04 | −0.48 | −6.85E−04 | −0.70 | −2.15E−04 | −0.22 |
| 20  | −4.29E−04 | −0.44 | −6.22E−04 | −0.63 | −1.93E−04 | −0.20 |
| 40  | −3.88E−04 | −0.39 | −5.59E−04 | −0.57 | −1.71E−04 | −0.17 |
| 60  | −3.46E−04 | −0.35 | −4.95E−04 | −0.50 | −1.49E−04 | −0.15 |
| 80  | −3.05E−04 | −0.31 | −4.32E−04 | −0.44 | −1.27E−04 | −0.13 |
| 100 | −2.64E−04 | −0.27 | −3.69E−04 | −0.38 | −1.05E−04 | −0.11 |
| 120 | −2.23E−04 | −0.23 | −3.06E−04 | −0.31 | −8.34E−05 | −0.08 |
| 140 | −1.81E−04 | −0.18 | −2.43E−04 | −0.25 | −6.15E−05 | −0.06 |
| 160 | −1.40E−04 | −0.14 | −1.80E−04 | −0.18 | −3.96E−05 | −0.04 |
| 180 | −9.88E−05 | −0.10 | −1.17E−04 | −0.12 | −1.77E−05 | −0.02 |
| 200 | −5.76E−05 | −0.06 | −5.34E−05 | −0.05 | 4.16E−06 | 0.00 |
| 220 | −1.63E−05 | −0.02 | 9.74E−06 | 0.01 | 2.61E−05 | 0.03 |
| 240 | 2.49E−05 | 0.03 | 7.29E−05 | 0.07 | 4.80E−05 | 0.05 |
| 260 | 6.62E−05 | 0.07 | 1.36E−04 | 0.14 | 6.99E−05 | 0.07 |
| 280 | 1.07E−04 | 0.11 | 1.99E−04 | 0.20 | 9.17E−05 | 0.09 |
| 300 | 1.49E−04 | 0.15 | 2.62E−04 | 0.27 | 1.14E−04 | 0.12 |

Based on the above calculations, the difference in strain for the two scenarios at an internal pressure of 300 bar is of the order of 100 microstrains. Assuming a resolution of the order of 1 microstrain, this would allow a determination of remaining corrosion allowance down to a resolution of ~0.1 mm. At an internal pressure of 0 bar, the difference is of the order of 200 microstrains, providing a potential resolution of 0.05 mm. At an internal pressure of 200 bar there is little difference in the strain as the internal and hyperbaric pressure balance out.

Figure 9:
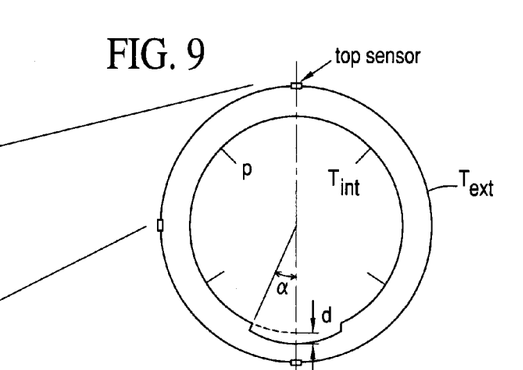
FIG. 9 illustrates a cross section of a pressurized pipe having FBG sensors applied to the top, side and bottom of the pipe.
Figure 10A:
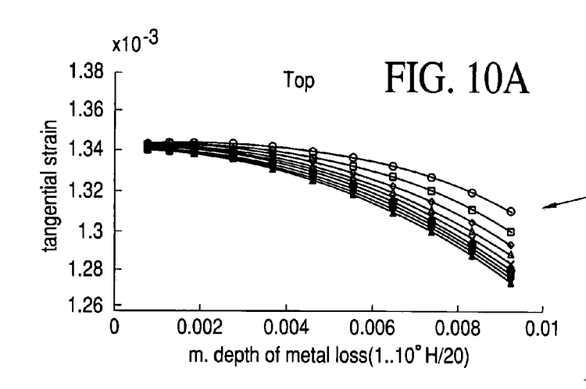
FIGS. 10A, 10B and 10C are graphs illustrating the tangential strain measured by the top, side and bottom FBGs vs. the depth of metal loss.
Figure 10B:
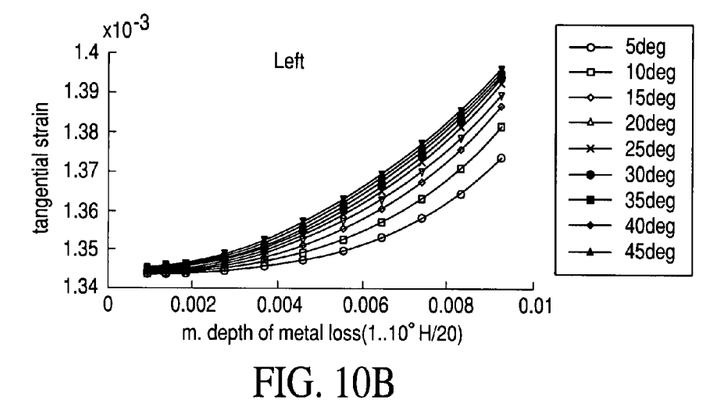
Figure 10C:
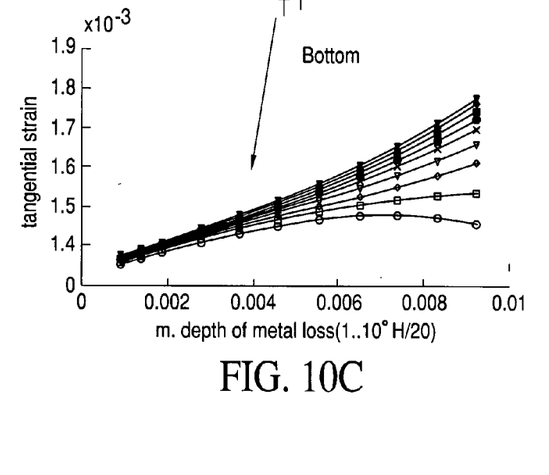

FIG. 9 and related FIGS. 10A, 10B and 10C illustrate how a numerical model may be used to convert strain measurements into a depth of metal loss. FIG. 9 is a diagram of a cross section of a model pipe in which there is metal loss at the bottom internal wall. The thickness, dimensions and material characteristics of the model pipe are chosen to be the same as the thickness, dimensions and material characteristics of an actual pipe for which the metal loss needs to be determined. The dimensions of the metal loss are defined by an angle $\alpha$ and a depth d. The model pipe is subjected to pressure P and temperatures $T_{int}$ and $T_{ext}$. The expected measured strain on the outside of the model pipe at the top, side and bottom locations as a function of the depth d of metal loss across angle $\alpha$ at the bottom of the pipe is determined by a mathematical model such as a Finite Element Analysis. Graphs of the calculated tangential strain are plotted for temperature differentials between $T_{int}$ and $T_{ext}$ of 5°, 10°, 15°, etc., up to a differential of 45°.

FBG strain sensors are placed at the top, side and the bottom of the actual pipe having the same thickness, dimensions and material characteristics as the pipe that was modeled. The tangential strain is measured at the top, side and bottom of the actual pipe. The differential between the temperatures $T_{int}$ and $T_{ext}$ is measured. The depth of metal loss is calculated using the appropriate curve of the family of curves illustrated in FIGS. 10A, 10B and 10C. Of course, the mathematical model used to determine the relationship between measured strain and depth of metal loss may correct for a number of other factors in addition to the temperature differential between $T_{int}$ and $T_{ext}$, such as the effects of bending or torsion applied to the pipe.

The above-described devices and subsystems of the exemplary embodiments can include, for example, any suitable servers, workstations, personal computers (PCs), laptop computers, personal digital assistants (PDAs), internet appliances, handheld devices, cellular telephones, wireless devices, other electronic devices, and the like, capable of performing the processes of the exemplary embodiments. The devices and subsystems of the exemplary embodiments can be configured to communicate with each other using any suitable protocol and can be implemented using one or more programmed computer systems or devices.

One or more interface mechanisms can be used with the exemplary embodiments, including, for example, internet access, telecommunications in any suitable form (e.g., voice, modem, and the like), wireless communications media, and the like. For example, the employed communications networks can include one or more wireless communications networks, cellular communications networks, 3 G communications networks, Public Switched Telephone Network (PSTNs), Packet Data Networks (PDNs), the internet, intranets, a combination thereof, and the like.

It is to be understood that the devices and subsystems of the exemplary embodiments are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention has been described in connection with a number of exemplary embodiments, and implementations, the present invention is not so limited, but rather covers various modifications, and equivalent arrangements.

The invention claimed is:

1. System for determining variations in the wall thickness of a pressurized pipe, comprising:
   an optical fiber including a plurality of Fiber Bragg Gratings (FBGs) along its length, and wherein said FBGs are secured over different discrete portions of said pipe; wherein at least one of said FBGs is located over a portion of said pipe expected to have negligible material loss and at least one of said FBGs is located over a portion of said pipe expected to have significant material loss,
   a mounting for securing the FBGs of the optical fiber over discrete portions of the exterior surface of the wall of the pressurized pipe such that strain in the discrete portions is transmitted to the FBGs;
   a light source and a light sensor coupled to the optical fiber, wherein the light sensor converts light reflected back from said FBGs into an electrical signal, and
   a digital processor that converts said electrical signal into a strain measurement and determines a wall thickness at least in part by comparing the strain measurements taken by FBGs located at the pipe portions expected to have significant material loss and FBGs located at the pipe portions expected to have negligible material loss.

2. The system of claim 1, wherein the mounting includes a composite material that the optical fiber and the FBGs is embedded in, and wherein the composite material is secured over the exterior surface of the pipe.

3. The system of claim 2, wherein the composite material is a composite sheet material that is wrapped around and adhered to the exterior surface of the pipe in such a way that the FBGs are secured over a selected discrete portion of the pipe.

4. The system of claim 2, wherein the composite material includes FBGs that are aligned around selected portions of the circumference of the pipe in such a way as to determine differential hoop strain across selected portions of the pipe.

5. The system of claim 2, wherein the composite material includes FBGs that are aligned along the longitudinal axis of the pipe in such a way as to determine axial strain along selected portions of the pipe.

6. The system of claim 2, wherein the composite material is applied over an elbow joint in said pipe, and said FBGs are aligned along the longitudinal axis of said pipe around said elbow joint.

7. The system of claim 1, wherein the mounting includes a composite clamp assembly attachable around at least part of the circumference of a pipe.

8. The system of claim 7, wherein the composite clamp assembly includes a plurality of sensor straps that determine differential hoop strain across selected portions of the pipe.

9. System for determining variations in the wall thickness of a pressurized pipe, comprising:
   an optical fiber including a plurality of Fiber Bragg Gratings (FBGs);
   a mounting for securing the FBGs of the optical fiber over discrete portions of an exterior surface of a wall of a pressurized pipe such that strain in the discrete portions is transmitted to the FBGs, wherein a first FBG is located over a portion of said pipe expected to have negligible material loss and a second FBG is located over a portion of said pipe expected to have significant material loss;
   a light source and a light sensor coupled to the optical fiber, wherein the light sensor converts light reflected back from said FBGs into electrical signals, and
   a digital processor that converts said electrical signals into strain measurements, and that determines a wall thickness at least in part by comparing the strain measurements taken by said first and second FBGs.

10. The system of claim 9, wherein the mounting includes a composite material that the optical fiber and FBGs are embedded in, and wherein the composite material is secured over the exterior surface of the pipe.

11. The system of claim 10, wherein the composite material is a composite sheet material that is wrapped around and adhered to the exterior surface of the pipe in such a way that the FBGs are secured over selected discrete portions of the pipe.

12. The system of claim 9, wherein the mounting includes a composite clamp assembly attachable around at least part of the circumference of a pipe and wherein the FBGs are mounted in a plurality of sensor straps that determine differential hoop strain across selected portions of the pipe.

13. A process for determining variations in the wall thickness of a pressurized pipe, comprising:
   mounting a first Fiber Bragg Grating (FBG) of an optical fiber over a discrete portion of an exterior surface of a wall of a pressurized pipe expected to have a full wall thickness;
   mounting a second FBG of the optical fiber over a discrete portion of the exterior surface of the wall of said pressurized pipe expected to have a thinner wall thickness of the pressurized pipe such that changes in the size of the discrete portions of the pipe apply strain to the FBGs;
   conducting light through an end of the optical fiber;
   converting light reflected from the first and second FBGs of the optical fiber into electrical signals indicative of a strain measurement,
   converting said strain measurement into a wall thickness; and
   determining a thickness of the thinner wall thickness by comparing strain measurements provided by the first and second FBGs.

14. The process of claim 13, further comprising:
   mounting at least one FBG along the longitudinal axis of the pipe to measure axial strain on the pipe, and
   mounting one or more FBGs around the circumference of the pipe to measure hoop stress at a plurality of discrete locations and correcting hoop stress measurements provided by said one or more FBGs based on said measured axial strain on the pipe.

15. The process of claim 13, further comprising the step of correcting the strain measurement provided by the FBGs by compensating for one or both of temperature and internal pipe pressure.

* * * * *